Feb. 28, 1961 T. E. DAVIDSON 2,972,817
LAUNDRY APPARATUS
Filed Nov. 19, 1956 6 Sheets-Sheet 1

INVENTOR.
THOMAS E. DAVIDSON
BY Edwin S. Dybvig
HIS ATTORNEY

INVENTOR.
THOMAS E. DAVIDSON
HIS ATTORNEY

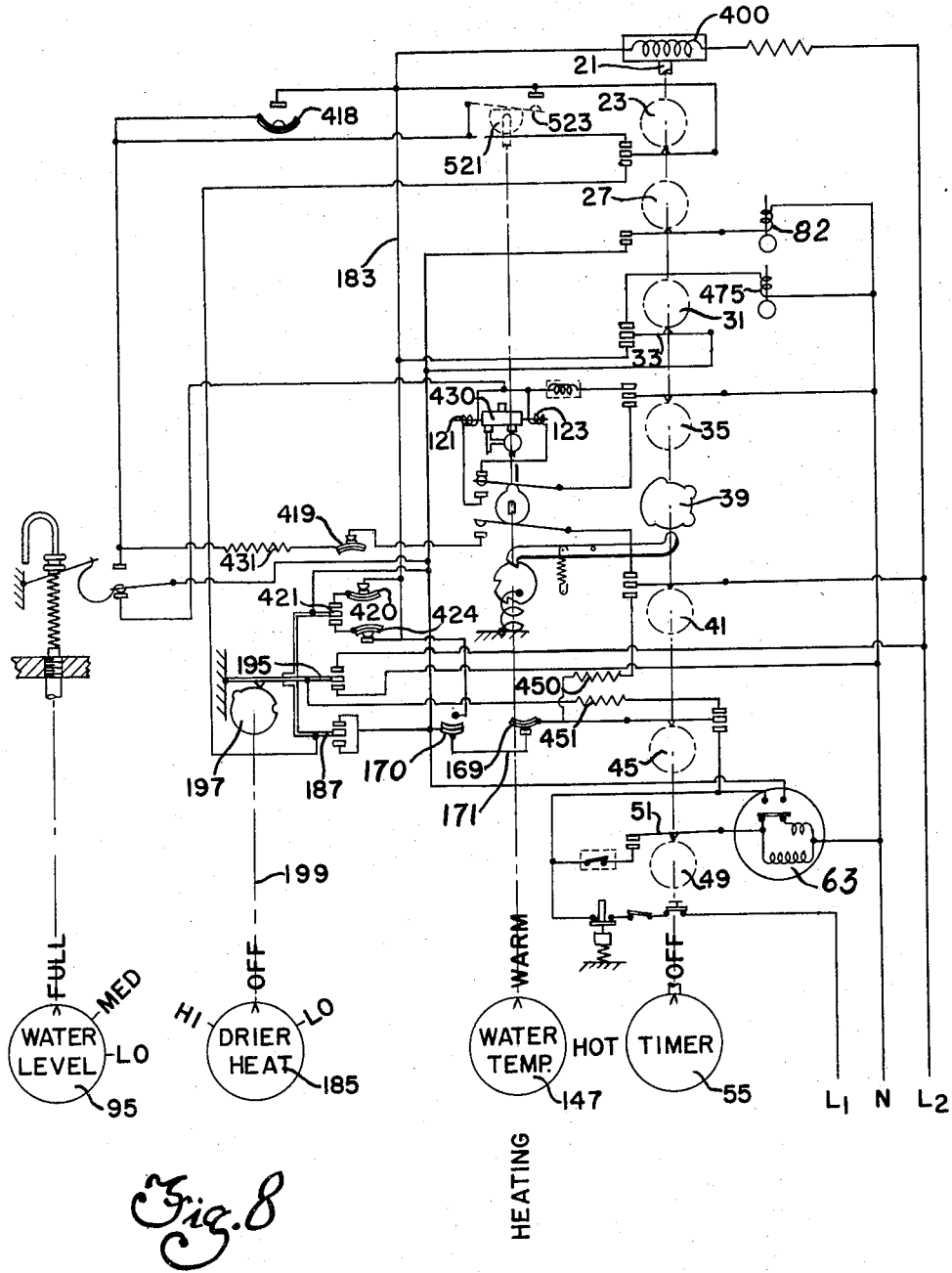

United States Patent Office 2,972,817
Patented Feb. 28, 1961

2,972,817
LAUNDRY APPARATUS

Thomas E. Davidson, Dayton, Ohio, assignor to General Motors Corporation, Detroit, Mich., a corporation of Delaware Filed Nov. 19, 1956, Ser. No. 623,051

3 Claims. (Cl. 34—45)

This invention relates to a domestic appliance and more particularly to laundry apparatus such as washers, dryers, and combined washers and dryers.

In laundry apparatuses provided with heaters it is important to provide a reliable thermostatic control for controlling the heaters thereof to maintain proper temperature and to prevent over heating. Especially in horizontal rotatable drum type of dryers is it important to locate the thermosensitive element of the thermostat controls at a location or locations most responsive to the dryness of the laundry.

It is an object of this invention to provide laundry apparatus with a more sensitive temperature control of the heaters thereof which is so located that it more readily will prevent damage to the laundry and also to the apparatus.

It is another object of this invention to provide a laundry dryer with a reliable sensitive temperature control so located that it more accurately will terminate or reduce the heating just before the laundry becomes completely dry.

It is still another object of this invention to provide a laundry dryer with a reliable temperature control having its thermosensitive element located in a relatively cool place where the temperature change is relatively large as the laundry approaches a state of dryness.

These and other objects are obtained in the form shown in the drawings in which a horizontal rotatable drum rotates within a cylindrical drum casing. The drum casing is provided with a water film condenser in the lower quarter on the ascending side of the drum as it rotates clockwise. Drying heaters are also provided in the top of the drum casing. When the apparatus is used for washing, a water heater may be provided at the bottom of the front of the drum casing. The bottom of the front of the drum casing is provided with a thermostat for terminating the water heating and a second safety thermostat for preventing over heating.

To terminate the operation of the heaters for drying when the laundry within the drum approaches a state of complete dryness there is provided in the periphery of the drum between the drying heaters and the bottom of the water film condenser a low temperature thermostat and a high temperature thermostat which are set to stop the heating when the laundry reaches a state of dryness consistent with the fabric and the maximum temperatures which the fabric can withstand. In addition two dryer safety thermostats are provided. One of these may be positioned between the top of the water film condenser and the adjacent dryer heater while a second may be placed adjacent the high and low temperature thermostats near the bottom of the water film condenser. These safety thermostats may be connected in series with each other and in series with all of the dryer heaters.

Further objects and advantages of the present invention will be apparent from the following description, reference being had to the accompanying drawings, wherein a preferred form of the present invention is clearly shown.

In the drawings:

Figure 8 is a control and wiring diagram for the washer and dryer shown in previous figures.

Figure 1:
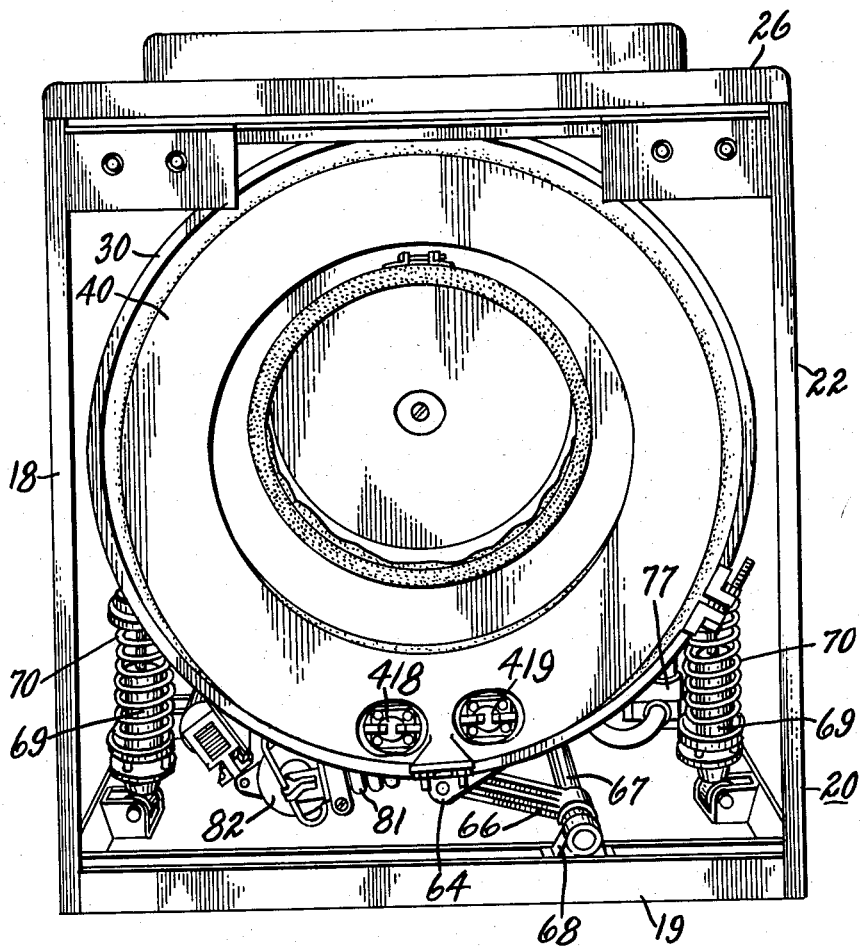
Figure 1 is a front view of a combined washer-dryer embodying one form of my invention with the front wall of the cabinet removed showing the front of the casing and its suspension.
Figure 2:
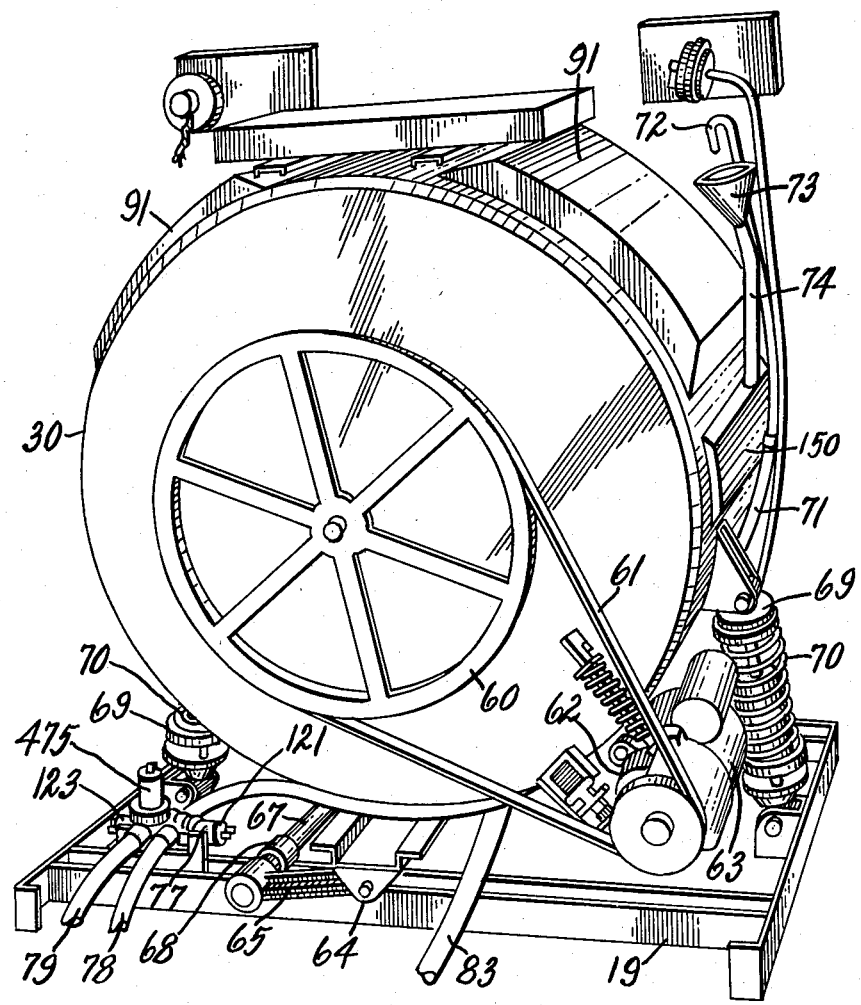
Figure 2 is a rear view of the casing and its suspension with the remainder of the cabinet removed.
Figure 3:
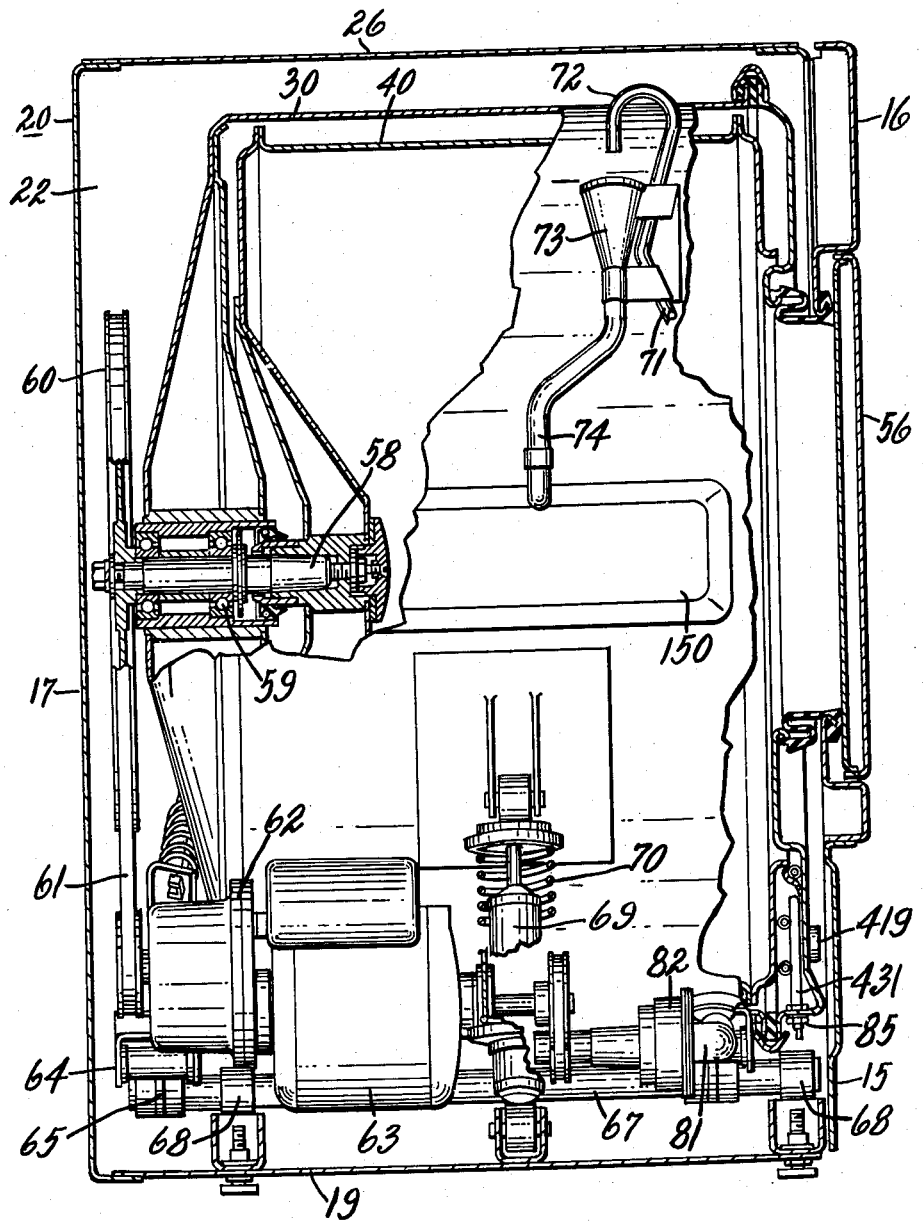
Figure 3 is a vertical sectional view taken along the axis of the drum and casing.
Figure 4:
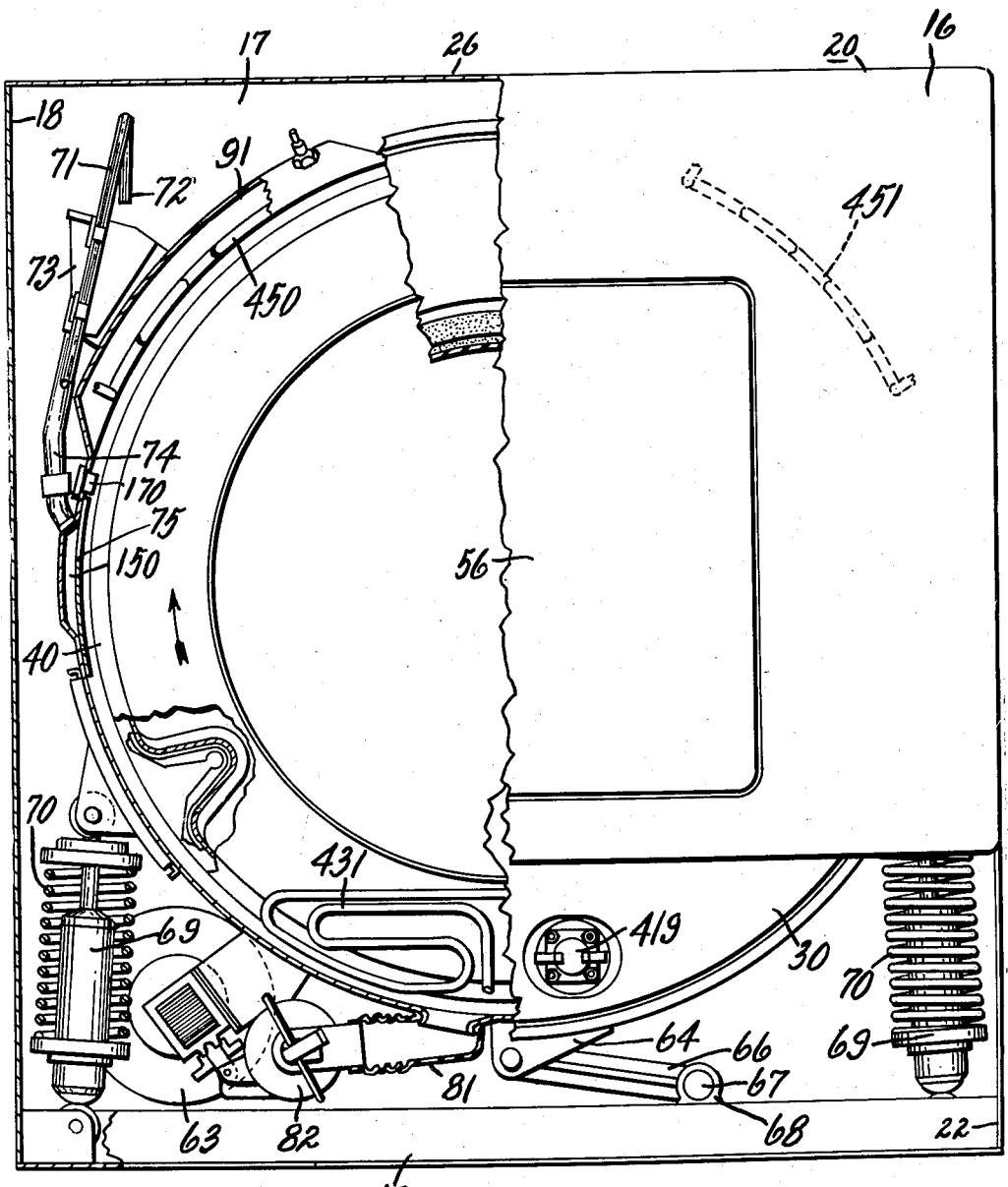
Figure 4 is a front view of the combined washer-dryer with one half thereof shown in a vertical section transverse to the axis of the drum.

Referring now to the drawings and more particularly Figures 1 to 3 there is shown a combined washer-dryer including a box-shape cabinet 20 formed of a base 19, side walls 22 and 18, a rear wall 17, a top wall 26, and a front wall in two sections 16 and 15. The section 16 is provided with a rectangular door 56 providing access to the interior of the drum casing 30 and the drum 40. The drum 40 is removably mounted upon the tapered bearing shaft 58 rotatably mounted in the ball bearings 59 which are supported by the rear wall of the drum casing 30. The rear end of the shaft 58 is provided with a large pulley 60 connected by a belt 61 to the transmission 62 and the electric drive motor 63. The drum casing 30 is provided with a lower bracket 64 pivotally connected at its ends to the lever arms 65 and 66 fixed to the ends of the horizontal bar 67 which is pivotally mounted in the bearings 68 fixed to the base 19. This lever arrangement guides the casing substantially in a vertical direction while its vibrations are controlled by the hydraulic shock absorbers 69 pivotally connecting the two sides of the casing 30 with the base 19. Coil springs 70 surround the hydraulic shock absorbers for supporting the drum casing 30.

For washing, water is introduced into the drum casing from a feed pipe 71 having a goose neck discharge 72 into the funnel 73 from which the water flows by gravity through the pipe 74 into the horizontal trough 150. The water overflows from this trough 150 over the lips 75 down the inner surface of the left quarter segment of the periphery casing 30 to its bottom portion. The feed pipe 71 receives water from a valve body 77 which includes a hot water solenoid 121 and a cold water solenoid 123. The solenoids 121 and 123 respectively provide full flow of hot and cold water from the hot and cold water supply conduits 78 and 79. Another solenoid 475 is provided on the valve body 77 for providing a limited flow of cold water to the trough 150 so that the water will overflow from this trough in the form of a thin film over the inner surface of the left lower quarter of the periphery of the casing. This forms a water film condenser used during the drying period to absorb the moisture from the laundry. At the end of the washing and rinsing periods and during the drying period, water is pumped out of the bottom of the casing 30 through the hose 81 by the pump 82 which discharges through the hose 83 to a suitable drain. The pump is driven by the motor 63.

Figure 5:
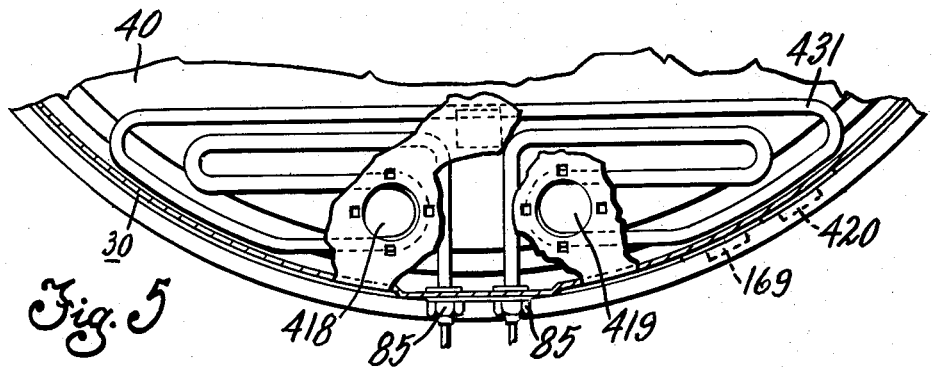
Figure 5 is a fragmentary view of the lower portion of the casing in section showing the water heater and its controls taken along the line 5—5 of Figure 6.
Figure 6:
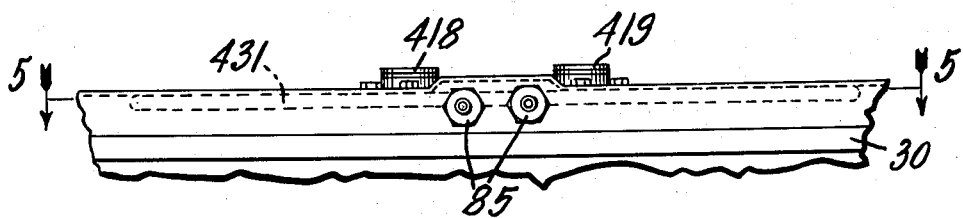
Figure 6 is a fragmentary bottom view of the portion of the casing shown in Figure 5.
Figure 7:
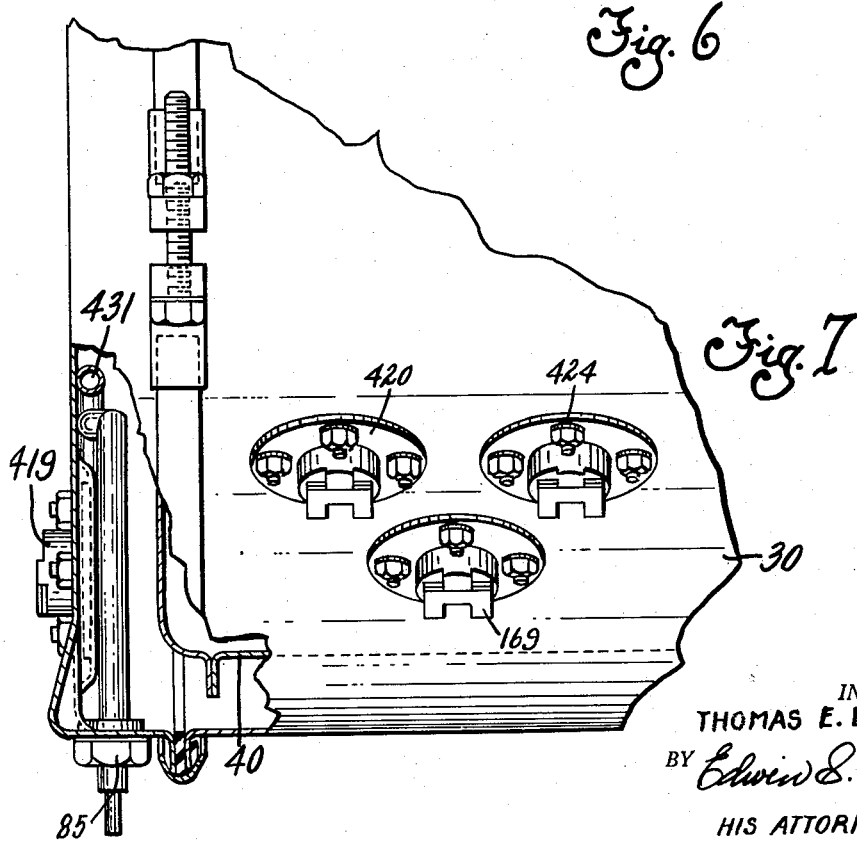
Figure 7 is a fragmentary view of the lower portion of the drum casing partly in section showing the location of the water heater and the three dryer thermostats.

For the purpose of heating the water in the event that the supply of hot water is inadequate, there is provided the sheathed tubular heater 431 directly adjacent the front of the drum casing 30 and having downwardly extending terminals extending through the bottom wall as shown best in Figures 5 to 7 and fastened in place by the nuts 85. To control this heater 431 there is provided a water heater thermostat 418 fastened into an opening in the lower front of the drum casing 30 as is shown in Figures 1 to 7 so that its thermosensitive element is in heat transfer with the water in the bottom of the drum casing for terminating the heating of the water when the water reaches the desired temperature. The thermostat 418 may be set to close at 150° F. and to reopen at 120° F. In addition, directly at one side there is provided the water temperature safety thermostat 419 set to open at a higher temperature such as 170° F. and to reclose at 120° F. which is contacted by an intermediate part of the heater 431 to respond quickly to high heater temperatures to protect and deenergize the water heater 431 in the event that the heater 431 becomes energized when there is no water in the casing. It also prevents very high water temperatures in case of failure of the thermostat 418.

After the washing and rinsing periods, the drum 40 is rotated at centrifuging speeds by the motor 63 and the transmission 62 to centrifugally dry the laundry therein. Thereafter there are energized the heaters 450 and 451 located in the two bumps 91 in the opposite upper quarters of the periphery of the drum casing 30. These heaters heat the laundry within the drum as it rotates at a slow speed fluffing and driving the moisture out of the laundry. This moisture vapor migrates to the water film flowing from the trough 150 down the inside of the casing. The drum 40 rotates in a clockwise position as viewed from the front as shown by the arrow in Figure 4. The heaters 450 and 451 operate until the laundry reaches a state of nearly complete dryness. However, since certain fabrics can withstand fairly high temperatures and many other fabrics cannot, there are provided a high temperature thermostat 420 and a low temperature thermostat 424 in the lower portion of the periphery of the drum casing directly opposite the water film condenser but somewhat nearer the bottom of the drum. The thermostats 420 and 424 respectively control high and low energy arrangements of the dryer heaters 450 and 451. These thermostats may for example, be set to close at 210° F. and 177° F. respectively. The closing of these thermostats acts to operate the timer to terminate the heating of the heaters 450 and 451 but to continue the flow of water under the control of the solenoid valve 475 and the rotation of the drum under the control of the switch 51. These thermostats 420 and 424 are set to reopen at 170° F. and 147° F. respectively.

I have found that at these locations as the laundry approaches a state of dryness in the drum 40, the temperature rises rapidly so that the termination of the heating by the heaters 450 and 451 can be terminated with considerable accuracy. In this position between the thermostats 420 and 424 and the bottom of the casing 30 I provide the safety thermostat 169 which is set to open to deenergize the heaters 450 and 451 when the temperature reaches 225° F. and to close at 175° F. This will operate in case of failure of the heaters to be deenergized through the timer by the thermostats 420 or 424. In addition connected in series with the thermostat 169 is a second thermostat 170 located on the opposite side of the periphery of the casing directly between the top of the water film condenser and the trough 150 and the heater 450. This location is especially sensitive to the failure of water flow as well as the failure of the drum to rotate and the failure of cooling air flow over this location. Therefore it provides important added safety in preventing damage to the laundry and to the apparatus in the event of failure of the controls. This second thermostat 170 is preferably a single pole double throw temperature responsive switch having a normally closed contact connected to the conductor 171 in Figure 8 and a normally open contact connected to the conductor 183 to energize the timer motor 400 to bring the cycle to its conclusion.

The apparatus may be controlled by any suitable control arrangements. One example is shown in Figure 8 in which the timing motor 400 through a shaft 21 drives the cams 23, 27, 31, 35, 39, 41, 45 and 49 as well as the combined knob and dial of 55. A water temperature selector 147 is provided for controlling the water heater 431 and the hot and cold water solenoids 121 and 123. A dryer heat selector 185 through the shaft 199 and the cam 197 operates the double throw switches 187, 195 and 421 to select either of the thermostats 420 or 424 and either a high or low energy circuit arrangement for the dryer heaters 450 and 451 for controlling the drying cycle. In addition there is also provided a water level control 95. The thermostats 170, 418, 420 and 424 restart the timing motor 400 to rotate the cams away from the heating position to the next operation. The safety thermostat 170 also directly shuts off the heaters. The water temperature safety thermostat 419 and the dryer safety thermostat 169 act only to deenergize their respective heaters 431 and 450 and do not affect the operation of the timing motor 400.

Further disclosure of this control system is to be found in the copending application of myself and Edward J. Frey, S.N. 548,644, filed November 23, 1955, which issued on March 15, 1960, as Patent 2,928,267.

With the above described arrangements of thermostats I have provided an improved control of water heating and drying.

While the form of embodiment of the invention as herein disclosed constitutes a preferred form, it is to be understood that other forms might be adopted, as may come within the scope of the claims which follow.

What is claimed is as follows:

1. A laundry apparatus including a drum casing, a rotatable drum within the casing, heating means within and extending over the greater part of the upper portion of said casing for heating laundry within said drum, condensing means extending from the mid-point on one side of the drum to the lower portion of the casing for condensing moisture vaporized from the laundry in said drum by the heating means, said heating means being located in close spaced relation with the upper part of the condensing means, and thermostatic control means operably connected to said heating means for controlling said heating means; said thermostatic control means having a thermosensitive element exposed upon the inner periphery of said casing between the adjacent portions of the heating means and the condensing means.

2. A laundry apparatus including a drum casing, a rotatable drum within the casing, means for rotating the drum in one direction of rotation within the casing, heating means within the upper portion of said casing for heating laundry within said drum, condensing means in a lower segment of the side of the casing on which the drum periphery ascends, and a higher and a lower temperature thermostatic switch means each having a thermosensitive operating element located at the lower portion of the casing on the side opposite the condensing means, a timer having a first time controlled switch for terminating the operation of the heating means and a second time controlled switch for terminating the rotation of the drum subsequent to the termination of the operation of the heating means, said timer including a timer drive motor, electric circuit means connecting said higher and lower temperature thermostatic switch means in parallel circuit with each other and in series with said timer drive motor to operate said timer drive motor when the selected higher or lower temperature is reached, electric circuit means connecting said first time controlled switch in series with said heating means for deenergizing said heating means at the end of the heating period, electric circuit means connecting said second time controlled switch in series with said means for rotating the drum for stopping the rotation of the drum subsequently to the end of the heating period, and selective switch means for selectively connecting said higher and lower temperature switch means into energizing relation with said timer to start said timer when the selected higher or lower temperature is reached.

3. A laundry apparatus including a drum casing, a rotatable drum within the casing, means for rotating the drum in one direction of rotation within the casing, heating means within the upper portion of said casing for heating laundry within said drum, condensing means in a lower segment of the side of the casing on which the drum periphery ascends, said heating means being located in close spaced relation with the upper part of said condensing means, an electric circuit operably connected to said heating means, a thermostatic switch means connected in said electric circuit in series with said heating means, said thermostatic switch means having a thermosensitive element located in said drum casing between said heating means and said condensing means on the side of the casing on which the drum periphery ascends for controlling said heating means.

References Cited in the file of this patent

UNITED STATES PATENTS

| | | |
|---|---|---|
| 2,279,656 | Chamberlin et al. | Apr. 14, 1942 |
| 2,644,245 | Hammell et al. | July 7, 1953 |
| 2,701,956 | Duquenne | Feb. 15, 1955 |
| 2,720,037 | Erickson | Oct. 11, 1955 |
| 2,743,533 | Smith | May 1, 1956 |
| 2,797,497 | Engel et al. | July 2, 1957 |
| 2,807,890 | Stone | Oct. 1, 1957 |